(No Model.)

J. A. SPRUNGER.
HARROW.

No. 354,262. Patented Dec. 14, 1886.

Witnesses:
J. W. Snyder
W. A. Seward

John A. Sprunger   Inventor
by James W. See
Attorney

UNITED STATES PATENT OFFICE.

JOHN A. SPRUNGER, OF BERNE, INDIANA.

HARROW.

SPECIFICATION forming part of Letters Patent No. 354,262, dated December 14, 1886.

Application filed March 18, 1886. Serial No. 195,661. (No model.)

*To all whom it may concern:*

Be it known that I, JOHN A. SPRUNGER, of Berne, Adams county, Indiana, have invented certain new and useful Improvements in Harrows, of which the following is a specification.

This invention pertains to harrows, and relates to certain improvements hereinafter distinctly pointed out.

The improvements will be readily understood from the following description, taken in connection with the accompanying drawings, in which—

Figure 1:
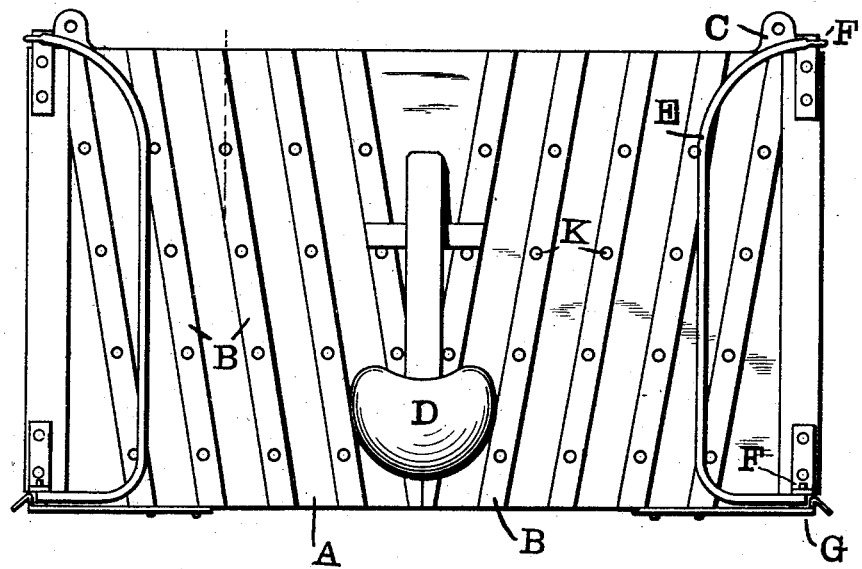
Figure 2:
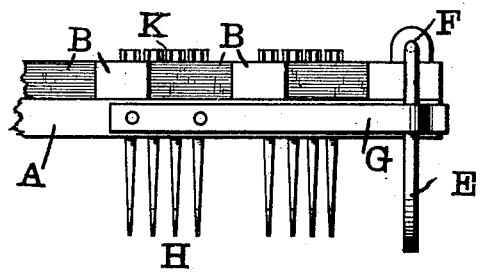
Figure 3:
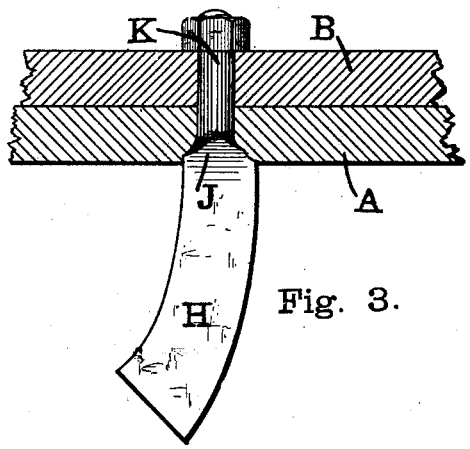

Figure 1 is a plan of a harrow embodying my improvements; Fig. 2, a rear view at one end thereof, upon a somewhat enlarged scale; and Fig. 3, a vertical section, upon an enlarged scale, through the deck and one of the deckribs, showing the manner in which the teeth are inserted.

In the drawings, A indicates the deck of the harrow, the same being formed of boards running from right to left, and set with their edges close together, so as to make the deck tight and enable the boards to mutually brace each other, the front edge of the deck being preferably curved upwardly in runner form; B, deck-ribs, consisting of heavy strips disposed obliquely across upon the upper surface of the deck, the ribs at the extreme right and left being placed squarely instead of obliquely; C, the hitching connections by which the harrow is drawn; D, the driver's seat, permanently secured to a diagonal standard, which is in turn permanently secured upon the deck; E, skeleton runners, being bent irons, whose ends are pivoted to the front and rear corners of the harrow, these runners being adapted to fold back upon the deck, as shown in Fig. 1, or to be turned down vertically, as shown in Fig. 2; F, the pivots upon which the runners turn, these pivots finding their bearings in pivot-supporting irons bolted to the harrow; G, spring-keepers bolted to the rear edge of the deck, and having inward projections at their outer ends, adapted to retain the runners in the position indicated in Fig. 2; H, the teeth, the same having a cross-section similar to that of a colter; J, the upper termination of the bladed portion of a tooth, and K a cylindrical shank reaching upward from the bladed portion of a tooth and provided with a nut.

When the harrow is in use, the runners lie upon the deck, and when the harrow is being transported, as in moving from field to field, the runners are turned down and the harrow is borne by them, with the teeth free of the ground, the spring-keepers holding the runners in this position. When the runners are to be turned back upon the deck, the free ends of the keepers are pushed outward, thus freeing the runners. The shanks of the teeth pass through the deck-boards and through the ribs, and the nuts upon them serve to hold the teeth in, and to hold the teeth firmly to the deck. The upper termination, J, of the teeth-blades enter the lower surface of the deck-boards and furnish shoulders acting upwardly as the shank-nuts are tightened, and, having a flattened section, they prevent the rotation of the shank.

I claim as my invention—

1. In a harrow, the combination of the deckboards A, the deck-ribs B, the teeth H, the pivoted runners E, and the keeper G, substantially as and for the purpose set forth.

2. In a harrow, the combination of the deckboards A, the deck-ribs B, and the colter-shaped teeth H, having cylindrical shanks projecting through the deck boards and ribs, and provided above with nuts, and having the upper termination of their blade portions projecting upward into the deck-boards, substantially as and for the purpose set forth.

JOHN A. SPRUNGER.

Witnesses:
 DAN SPUNGER,
 JEFF LEHMAN.